US010161487B2

(12) United States Patent
Pease et al.

(10) Patent No.: US 10,161,487 B2
(45) Date of Patent: Dec. 25, 2018

(54) TOOTHED BELT AND SPROCKET SYSTEM

(71) Applicant: GATES CORPORATION, Denver, CO (US)

(72) Inventors: Jennifer E. Pease, Lakewood, CO (US); Leslee Brown, Broomfield, CO (US)

(73) Assignee: Gates Corporation, Denver, CO (US)

( * ) Notice: Subject to any disclaimer, the term of this patent is extended or adjusted under 35 U.S.C. 154(b) by 140 days.

(21) Appl. No.: 15/452,453

(22) Filed: Mar. 7, 2017

(65) Prior Publication Data

US 2018/0259043 A1    Sep. 13, 2018

(51) Int. Cl.
*F16H 7/00* (2006.01)
*F16G 1/28* (2006.01)
*F16G 5/20* (2006.01)
*F16H 7/02* (2006.01)
*F16H 55/17* (2006.01)
*F16G 1/08* (2006.01)

(52) U.S. Cl.
CPC ............... *F16H 7/023* (2013.01); *F16G 1/08* (2013.01); *F16G 1/28* (2013.01); *F16H 55/171* (2013.01)

(58) Field of Classification Search
CPC .......... F16G 1/28; F16H 7/023; F16H 55/171; F16H 7/02; Y10T 74/19972
USPC .................................. 474/205, 153
See application file for complete search history.

(56) References Cited

U.S. PATENT DOCUMENTS 2,987,932 A * 6/1961 Szonn ............... B65G 23/06
474/153
3,404,576 A * 10/1968 Cicognani ............... F16G 1/28
474/148
3,756,091 A * 9/1973 Miller .................. B62D 55/12
474/153
(Continued)

FOREIGN PATENT DOCUMENTS

EP         2217830 B1     4/2012
JP         H11148538 A    6/1999

OTHER PUBLICATIONS

European Patent Office, International Search Report and the Written Opinion of the International Searching Authority, application No. PCT/US2018/020444, dated May 11, 2018.

*Primary Examiner* — Henry Y Liu
(74) *Attorney, Agent, or Firm* — Jeffrey A. Thurnau, Esq.; Paul N. Dunlap, Esq.

(57) ABSTRACT

A belt and sprocket system comprising a tensile cord disposed within a belt body, at least two teeth projecting from the belt body, the belt comprising a pitch length measured between the at least two teeth on the belt, one of the at least two teeth having a tooth tip and a profile comprising a first radius and a second radius and a third radius disposed between a first linear segment and a second linear segment, the sprocket having a groove for receiving one of the at least two teeth, the groove profile comprising a first radius and a second radius and the third radius and a fourth radius, each of which is connected in series to the others and each of which is unequal in length to the other radii, the tooth having a width that is approximately 35% of a pitch length at 90% of a tooth height so as to result in an interference fit between the one of at least two teeth and groove at 90% of the tooth height; and a volume between the tooth tip and the groove.

14 Claims, 6 Drawing Sheets

(56) References Cited

U.S. PATENT DOCUMENTS

| | | | | |
|---|---|---|---|---|
| 3,968,701 | A * | 7/1976 | Maruyama | F16G 1/28 474/153 |
| 3,996,812 | A * | 12/1976 | Cappotto | F16G 1/28 474/153 |
| 4,007,644 | A * | 2/1977 | Weinberger | F16G 1/28 474/148 |
| 4,148,225 | A * | 4/1979 | Redmond, Jr. | F16H 7/023 474/148 |
| 4,233,852 | A * | 11/1980 | Bruns | F16H 55/171 474/153 |
| 4,337,056 | A * | 6/1982 | Bruns | F16G 1/28 474/153 |
| 4,403,979 | A * | 9/1983 | Wujick | F16H 55/171 474/153 |
| 4,427,403 | A * | 1/1984 | Kanamori | F16G 1/28 474/153 |
| 4,515,577 | A * | 5/1985 | Cathey | F16H 7/023 474/153 |
| 4,679,999 | A * | 7/1987 | Wetzel | F16G 1/28 474/153 |
| 4,722,721 | A * | 2/1988 | Wetzel | F16G 1/28 474/153 |
| 4,840,606 | A * | 6/1989 | Wetzel | F16G 1/28 474/153 |
| 6,485,384 | B1 * | 11/2002 | Ochiai | B41J 19/005 474/153 |
| 2009/0275433 | A1 | 5/2009 | Gaynor | |
| 2009/0156341 | A1 * | 6/2009 | Gaynor | F16G 1/28 474/153 |

* cited by examiner

| | CENTER POINTS | | |
|---|---|---|---|
| | RADIUS | X | Y |
| R1 | 0.10625 | -0.37714 | -0.10602 |
| R2 | 0.25556 | -0.00001 | -0.14284 |
| R3 | 0.14945 | -0.0843 | -0.20728 |
| R4 | 0.09721 | -0.10037 | -0.25847 |

| | SEGMENT INTERSECTION | |
|---|---|---|
| | X | Y |
| P1 | -0.37012 | 0 |
| P2 | -0.27216 | -0.08969 |
| P3 | -0.25117 | -0.18992 |
| P4 | -0.20192 | -0.29948 |
| P5 | -0.15447 | -0.33923 |
| P6 | -0.11302 | -0.25485 |
| P7 | 0 | -0.35569 |

| | CENTER POINTS | | |
|---|---|---|---|
| | RADIUS | X | Y |
| R1 | 0.09326 | -0.37538 | -0.10527 |
| R2 | 0.20470 | -0.06584 | -0.13357 |
| R3 | 0.37944 | 0.05053 | -0.00208 |
| R4 | 0.44931 | 0.08353 | 0.05981 |
| R5 | 0.24296 | -0.00871 | -0.12477 |
| R6 | 0.26727 | -0.00338 | -0.10104 |

| | SEGMENT INTERSECTION | |
|---|---|---|
| | X | Y |
| P1 | -0.38155 | -0.01222 |
| P2 | -0.28400 | -0.08666 |
| P3 | -0.26391 | -0.18524 |
| P4 | -0.22088 | -0.26723 |
| P5 | -0.15892 | -0.31847 |
| P6 | -0.11893 | -0.34130 |
| P7 | -0.06969 | -0.35996 |
| P8 | 0.00000 | -0.36829 |

TOOTHED BELT AND SPROCKET SYSTEM

BACKGROUND OF THE INVENTION

1. Field of the Invention

This invention relates generally to a system of toothed belt and sprocket profiles having a tooth flank engaging a predetermined portion of the sprocket groove such that the land pressure is reduced, and more particularly to a belt having a truncated tooth tip forming a reservoir between tooth and sprocket groove, and with the tooth engaging a predetermined portion of the sprocket groove such that the tooth is supported by an interference fit in a manner to reduce land pressure.

The prior art belt and sprocket system is based on a mold groove profile with clearance between a belt tooth tip and the bottom of the pulley groove. There is also some shrinkage in the belt tooth height after curing that increases this clearance between the belt tooth tip and pulley groove bottom. This clearance can cause the pitch line of the belt to become chordal over the pulley groove as the belt teeth in rack form mesh with the sprocket grooves. The chordal action causes undue wear in the land portion of the belt. The forces within the belt must be supported by the pulley. This support consists of pressures that develop and are distributed between the tooth tip/groove bottom, the tooth flank/pulley flank, and the belt land between the belt teeth. The portion of this support distributed on the belt land can be large enough to result in undue wear of the land portion of the belt.

Further, as the belt pitch line is repeatedly raised and lowered by the driver and driven sprocket teeth through chordal action, the angular velocity of the driven sprocket alternately increases and decreases. This cogging action can be felt as a vibration in the system.

2. Description of the Prior Art

A number of design strategies for toothed belt and pulley profiles have been proposed in the prior art. Representative of the art is U.S. Pub No 2009/0156341 which discloses a belt and sprocket system comprising a tensile cord disposed within a belt body, a tooth projecting from the belt body, the tooth having a profile having at least two unequal radii connected in series and disposed between a tooth tip and a tooth root, a sprocket having a groove for receiving the tooth, the groove profile comprising at least one substantially linear portion disposed between the at least two unequal radii, a tooth tip engaging a predetermined portion of the sprocket groove such that the tensile cord is supported in a manner to cause the tensile cord to have a substantially arcuate form between the tooth roots.

What is needed is a belt having a truncated tooth tip forming a reservoir between tooth and sprocket groove, and with the tooth engaging a predetermined portion of the sprocket groove such that the tooth is supported by an interference fit in a manner to reduce land pressure. The present invention meets this need.

SUMMARY

The present invention is directed to systems and methods which provide a belt/sprocket profile system particularly a belt having a truncated tooth tip forming a reservoir between tooth and sprocket groove, and with the tooth engaging a predetermined portion of the sprocket groove such that the tooth is supported by an interference fit in a manner to reduce land pressure.

The invention comprises a belt and sprocket system comprising a tensile cord disposed within a belt body, at least two teeth projecting from the belt body, the belt comprising a pitch length measured between the at least two teeth on the belt, one of the at least two teeth having a tooth tip and a profile comprising a first radius and a second radius and a third radius disposed between a first linear segment and a second linear segment, the sprocket having a groove for receiving one of the at least two teeth, the groove profile comprising a first radius and a second radius and the third radius and a fourth radius, each of which is connected in series to the others and each of which is unequal in length to the other radii, the tooth having a width that is approximately 35% of a pitch length at 90% of a tooth height so as to result in an interference fit between the one of at least two teeth and groove at 90% of the tooth height; and a volume between the tooth tip and the groove.

The foregoing has broadly outlined the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
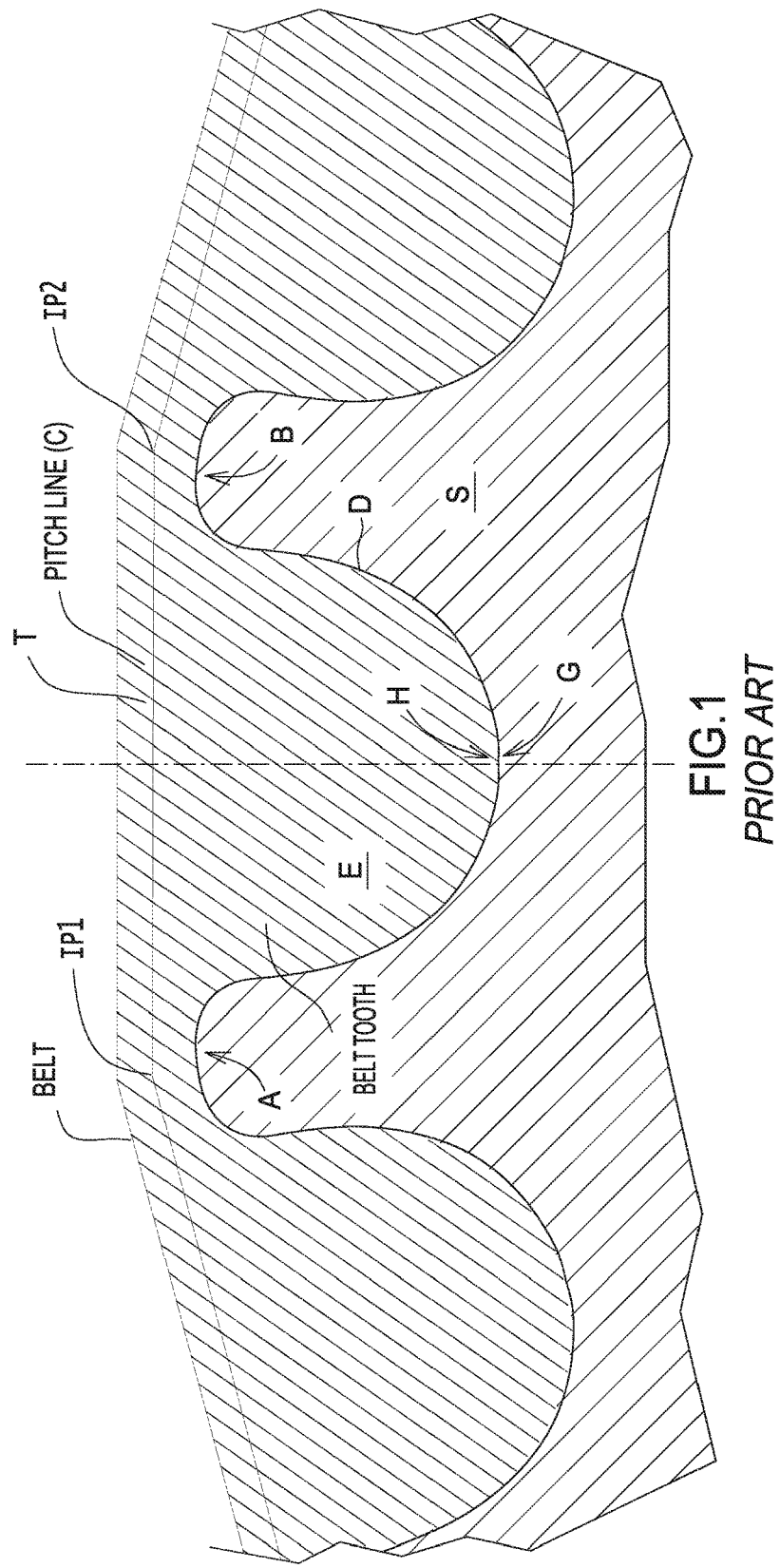
FIG. 1 is a profile of a prior art belt and sprocket showing the chordal effect.

FIG. 1 is a profile of a prior art belt and sprocket showing the chordal effect. A prior art toothed belt system comprises a belt having a pitch line (C). The pitch line generally coincides with the tensile cord T location in the belt body, but this is not always the case. The tensile cord carries the belt load during operation of the belt in a belt drive system. FIG. 1 is a side view of the belt and sprocket. In the art, a "tooth" is disposed across the width of a belt and may be typically arranged on a normal to the tensile cords or the longitudinal direction of the belt.

The toothed belt typically engages a sprocket (S) having a groove (D). A belt tooth (E) engages a sprocket groove (D). FIG. 1 is a depiction of a portion of the sprocket engaged with one belt tooth according to a prior art design. Typically a number of teeth will engage each sprocket. The belt bears upon the outer surface of the sprocket which includes portions (A) and (B). A sprocket generally engages a mechanical device which is then driven by the toothed belt. Each groove on the sprocket extends parallel to the axis of rotation of the sprocket.

In operation the pitch line "spans" between A and B causing the pitch line (C) and hence tensile cord T to be substantially linear between A and B. This is because during production there is some shrinkage of the tooth or a clearance may be required. This can result in a gap or non-loaded condition between the groove bottom G and the tooth tip H. This in turn causes the pitch line of the belt to become chordal (linear) over the pulley groove portions (A and B) as the belt teeth in rack form mesh with the sprocket grooves. In effect, the pitch line "breaks" or bends at the inflection points IP1 and IP2. Points A and B are approximately where the sprocket engages the tooth root or land.

Consequently, during operation as the belt pitch line is raised and lowered by the sprocket teeth, the angular velocity of the sprocket alternately increases and decreases. This can cause an undesirable vibration in a belt drive system and can affect engine timing as well. This can lead to premature wear and failure of the belt at the belt land between the belt teeth. As the internal belt forces are relieved by or increased by the transfer of fluctuating power with the pulley, the belt is worn by the combination of land pressure and the relative velocity between the belt and the land.

Figure 2:
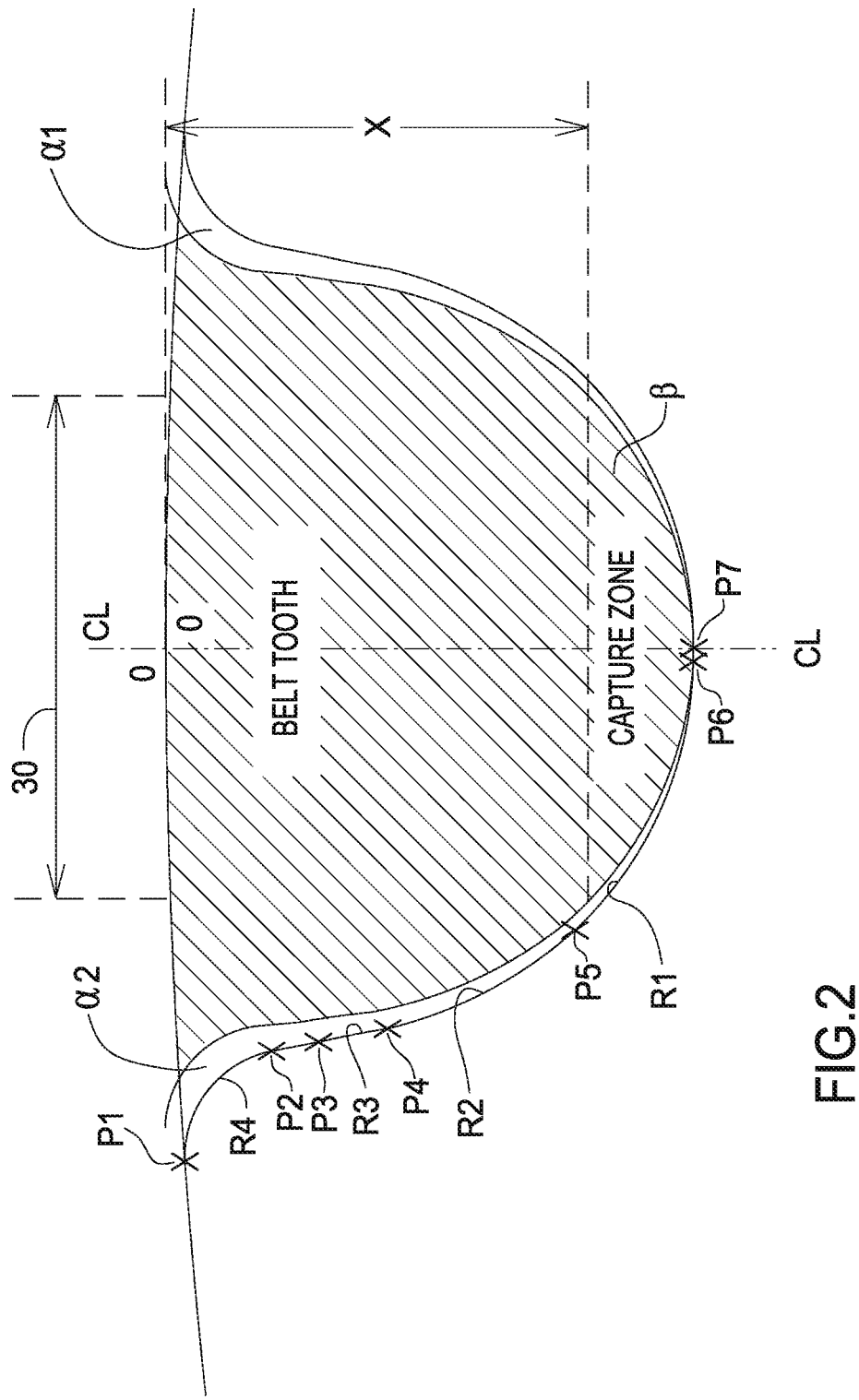
FIG. 2 is a profile of another prior art belt and sprocket showing support at the tooth tip.

FIG. 2 is a profile of a prior art belt and sprocket showing the tooth bottoming out in the groove which tends to push the cord line back up into an arcuate shape. Due to the slightly differing dimensions between the tooth and the groove, there are two gaps ($\alpha 1$) and ($\alpha 2$) disposed between the flanks of the tooth and the groove. The tip of the tooth contacts the bottom of the groove, leaving no room to accommodate trapped oil in a oil-wet drive system. There is a capture zone at the tip of the tooth in the groove bottom wherein the tooth is "captured" within the groove. This means that in operation, the tooth tip undergoes compression under load in the groove bottom in a manner which supports the overlying portion of the tensile cord T in a substantially arcuate form, see portion 30. However, the entire tooth is not fully compressed, instead, it is only the portion of the tooth occupying the groove between groove bottom and approximately point P5. This also corresponds to the radius portions R1 on each side of centerline CL.

The inventive belt provides three areas of support for the belt by the sprocket: the bottom of the groove, the flank of the groove, and the belt land. The prior art belts rely on too much support being provided by the belt land whereas the inventive belt and sprocket allows more of this support to be shifted to the tooth flank and belt groove thereby reducing land pressure. The wedge form supports the tooth while allowing space beneath it in the groove. Some support, although reduced, remains at the belt land.

When the belt and tooth is fully engaged during operation, the tooth material is compressed thereby expanding to substantially occupy gaps ($\alpha 1$) and ($\alpha 2$). This occurs simultaneously with the tensile cord portion 30 being supported by the material within the zone. As a result of the support the tensile cord T takes a substantially arcuate form between roots 50, 51 with a radius RT, see FIG. 3. Although this may result in significantly reduced vibration of the belt during operation, there is no room to accommodate oil in a wet system at the tooth tip. A nearly incompressible fluid such as oil will create its own space and can be trapped along the tooth flank and land increasing the pressure between tooth and groove.

Figure 3:
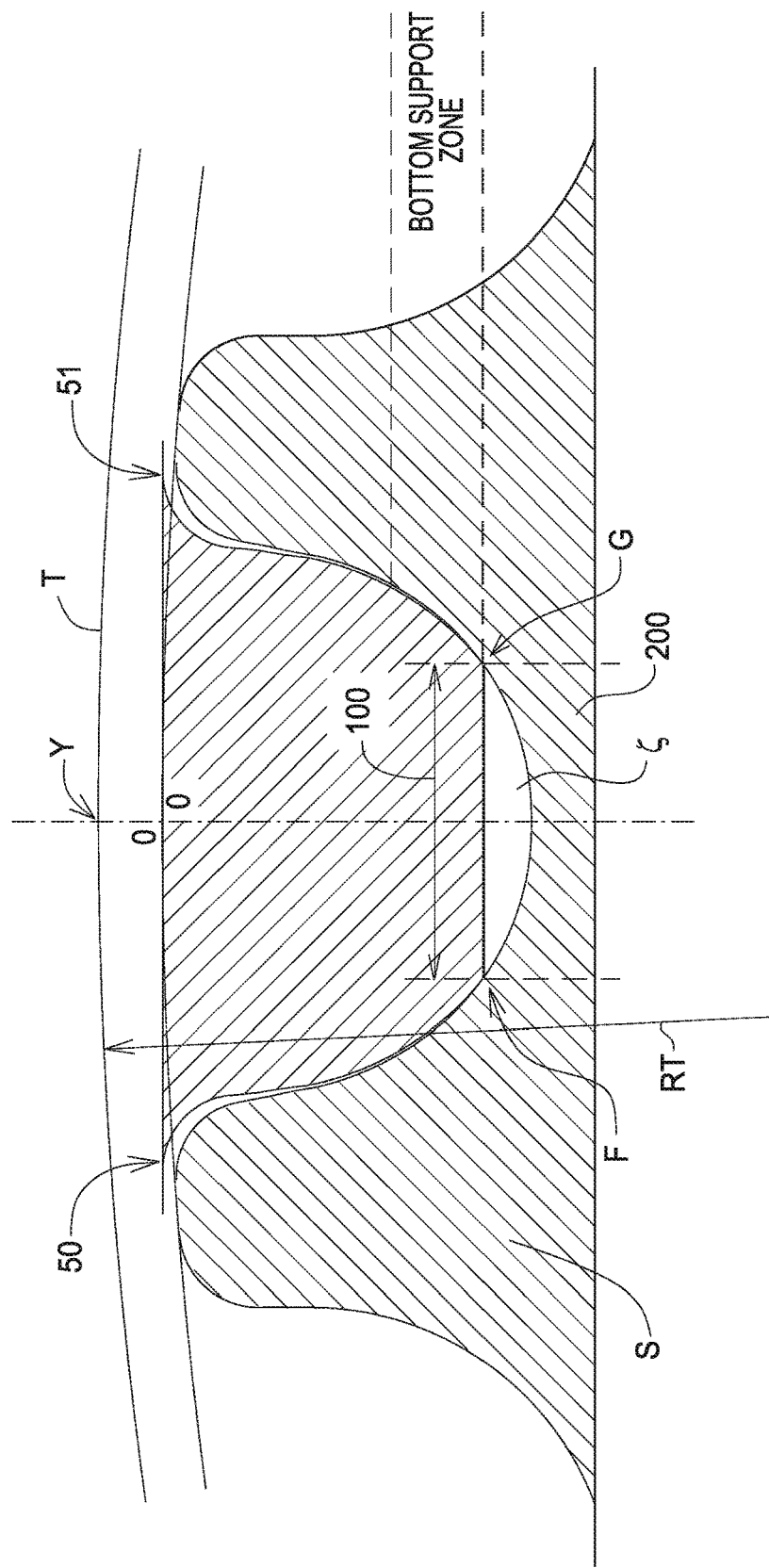
FIG. 3 is a profile of another prior art belt and sprocket showing a flat tooth and free volume between tooth tip and pulley groove.

FIG. 3 is a profile of a prior art belt and sprocket showing the tooth tip truncated thereby leaving a gap $\zeta$ instead of bottoming out in the groove. The tooth is supported in part by the bottom support zone. Although gap $\zeta$ accommodates trapped oil in a wet system, it has been found that belts with such a reservoir take most of the load in the land portion of the belt profile, between the teeth (50, 51), thus often leading to land wear as the typical failure mode. In this case the pulley groove provides little support to the belt increasing the support needed at the land, and increasing the pressure needed in the land to support the belt. In a situation with reduced frictional support on the flank, the land pressure is further increased.

Figures 4, 4A, 4B:
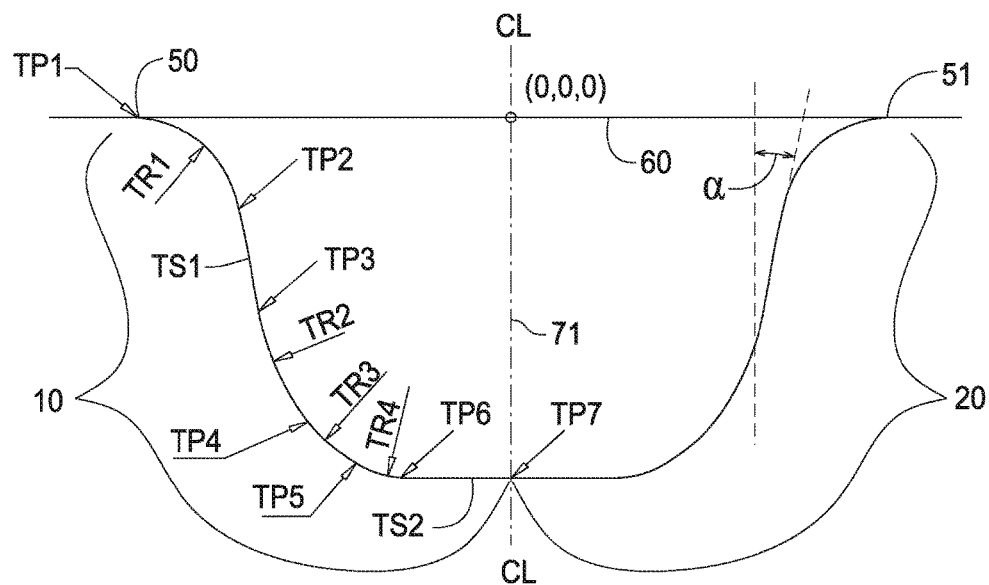
FIG. 4 is a side view of the inventive tooth profile.
FIG. 4A and FIG. 4B are each a table of example dimensions.
Figures 5, 5A, 5B:
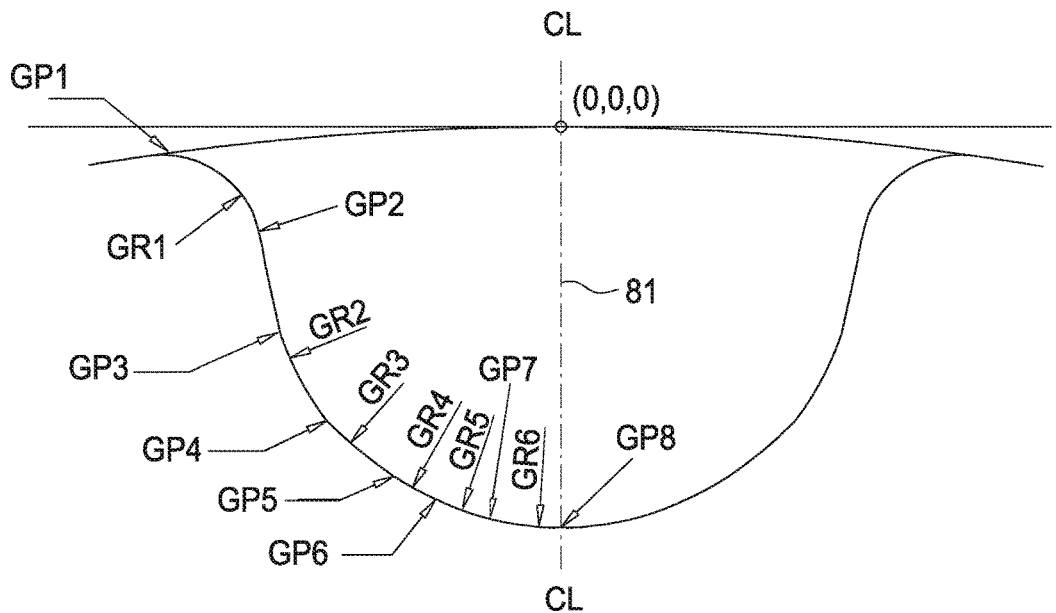
FIG. 5 is a side view of the inventive belt groove profile.
FIG. 5A and FIG. 5B are each a table of example dimensions.
Figure 6:
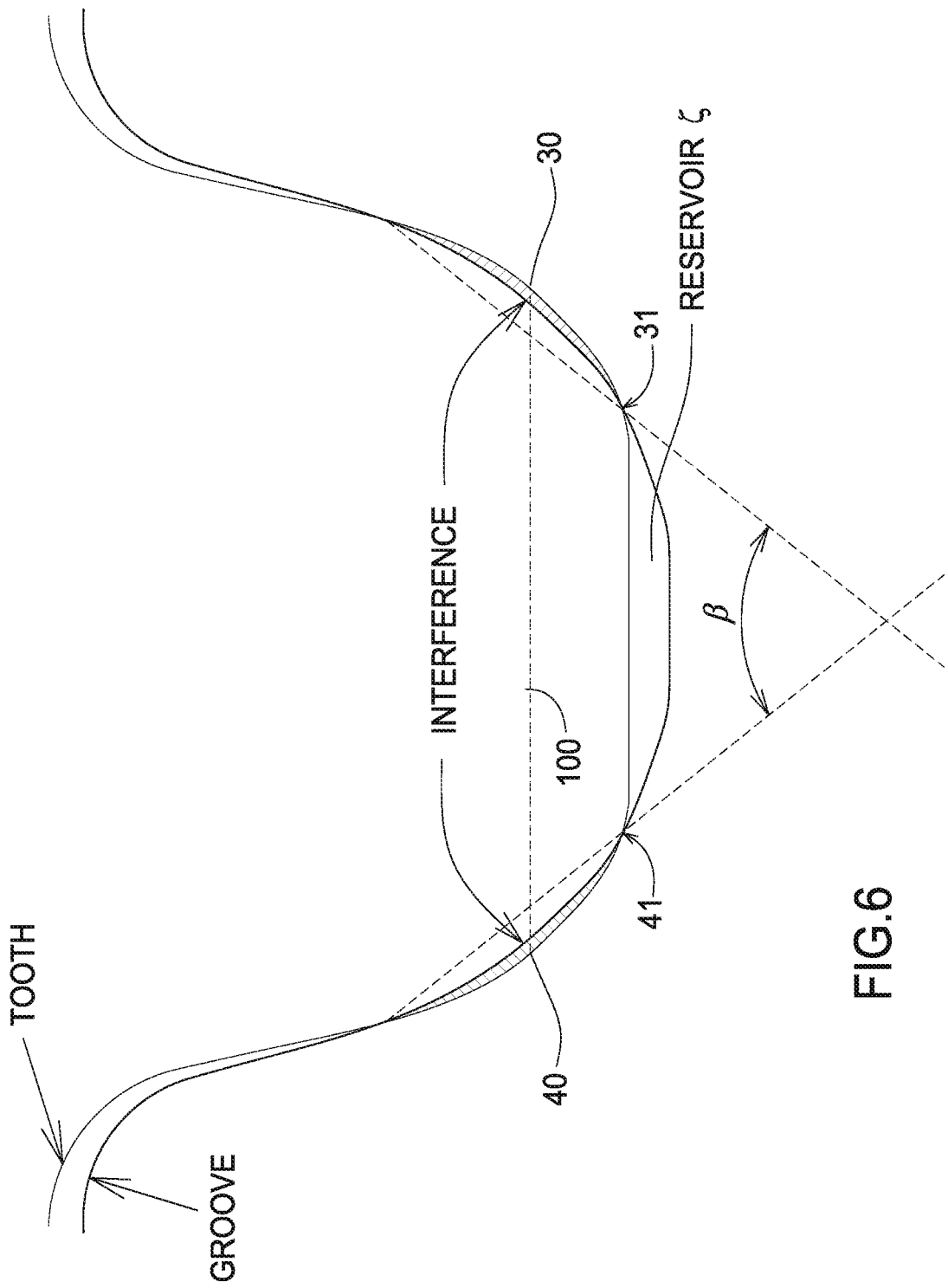
FIG. 6 is a side view of the inventive belt tooth profile overlaying the inventive groove profile.

FIG. 4 is a side view of the inventive tooth profile and FIG. 5 is a side view of the inventive sprocket groove profile. The inventive system comprises a toothed belt and sprocket. FIG. 6 is an overlay of the inventive tooth and sprocket profiles.

The inventive tooth profile decreases land pressure by supporting the tooth in a non-locking wedge. The groove now supports the belt diminishing the amount of support required at the land thereby decreasing the land pressure. The invention also increases the stiffness of the belt tooth by widening the tooth near the tip end. Shortening the tooth also allows cleaner meshing.

The inventive tooth and groove provide a cavity $\zeta$ (FIG. 6) between the tooth tip and groove for accumulating oil or other fluids that may migrate to the location. For example, in operation oil can become trapped around the pulley flanks and land increasing pressure and exacerbating the land wear conditions. The cavity provides a means to remove this oil.

The inventive profile provides a tooth and groove of dissimilar shapes. The shapes of the tooth and groove are similar at the base of the tooth, but diverge at the groove bottom to support the tooth at the tooth tip. The inventive tooth tip is thicker than the groove at the groove bottom. The width of the tooth tip is approximately 35% of the pitch length located at 90% of the tooth height. This results in proper compression of the tooth tip and a "wedging" support of the tooth within the groove. The inventive tooth is also short compared to the art. The total tooth height is no more than approximately 40% of the pitch length. A short tooth allows for proper meshing, despite the width of the tooth tip.

For example, given a pitch of 11 mm, the width of the tooth tip at 90% of the tooth height is 0.35×11 mm=3.85 mm. The total tooth height is 0.4×11=4.4 mm.

The tooth angle $\alpha$ at the root is at least 11 degrees. This prevents the tooth from being too "upright" which causes meshing issues and can increase system noise.

The cooperating sprocket groove comprises a width of between 83% and 87% of the tooth width at 90% of the tooth height, see FIG. 6. In other words, at 90% of the tooth height the groove width is between 15% to 20% less than the tooth width. Hence, the oversize tooth tip creates an interference fit with the groove which supports the tooth during operation. The groove comprises a maximum depth 81 that is greater than the tooth height 71 in order to support the tooth by the sides of the tooth tip. This allows for a fluid collection reservoir ζ at the tooth tip. Depth 81 is measured from (0,0,0) to GP8. Tooth height 71 is measured from (0,0,0) to TP7.

The sprocket comprises an angle β between 100 degrees and 120 degrees at the tooth tip. The angle allows for a non-locking wedging effect to support the tooth. Angle β is disposed between the intersection points where the tooth tip contacts the groove (31, 41), see FIG. 6. A depth D at the tip of the angle is between 39% and 44% of the pitch length. A groove angle at the root is within 2 degrees of the tooth angle. The similarity in the angles allows for proper support of the tooth flank, which in turn relieves stresses at the tooth flank. A fillet radius between the sprocket tooth and OD is between 0.081 and 0.086 times the pitch length. This also helps insure proper support at the tooth flank in order to increase durability.

An example belt tooth is dimensioned as shown in FIG. 4A and 4B. The values in FIG. 4A and FIG. 4B are given as examples only and are not intended to limit the breadth of the invention. Origin (0,0,0) is disposed on the belt ID.

Each tooth comprises two halves jointed together, 10 and 20, about a centerline CL. Each half comprises four radii TR1, TR2, TR3 and TR4 connected to each other in series. A substantially linear segment TS1 is disposed between TR1 and TR2 between points TP2 and TP3. Each radii described in this specification is a segment of a circle, meaning each radius is substantially constant. In an alternate embodiment, each radius TR1 or TR2 or TR3 or TR4 may vary as a function of dR/dx as may be required by the operational conditions.

Each radius TR4 for each half of the tooth is connected by a linear segment TS2.

The inventive belt body may comprise any conventional and/or suitable cured or thermoplastic elastomer composition. Suitable elastomers that may be utilized for this purpose include for example polyurethane elastomers (including as well polyurethane/urea elastomers) (PU), polychloroprene rubber (CR), acrylonitrile butadiene rubber (NBR), hydrogenated NBR (HNBR), styrene-butadiene rubber (SBR), alkylated chlorosulfonated polyethylene (ACSM), epichlorohydrin, polybutadiene rubber (BR), natural rubber (NR), and ethylene alpha olefin elastomers such as ethylene propylene copolymers (EPM), ethylene propylene diene terpolymers (EPDM), ethylene octene copolymers (EOM), ethylene butene copolymers (EBM), ethylene octene terpolymers (EODM); and ethylene butene terpolymers (EBDM); and silicone rubber, or a combination of any two or more of the foregoing.

Tensile cord 60 may comprise polyester, carbon fiber, metal wire, nylon, aramid, glass or any combination of two or more of the foregoing in any suitable and/or conventional configuration such as plied or braided, and generally may comprise one or a plurality of strands which may themselves be of any suitable and/or conventional configuration such as plied or braided, and generally may comprise one or a plurality of yarns. "Yarn" refers to a bundle of filaments or fibers in the form as received from a yarn manufacturer, which may include twisted yarn or yarn with no twist. "Strand" refers to a yarn or yarns that have been twisted, plied or braided as an intermediate step in forming a cord. The belt may have a surface layer on the tooth side or back side or both, which may comprise a coating, a fabric, a polymer film, or combinations thereof, preferably wear resistant and providing suitable environmental resistance for the intended application.

FIG. 5 is a side view of the inventive sprocket groove. The groove profile comprises radii GR1, GR2, GR3, GR4, GR5 and GR6, each radii being joined in series between points GP2, GP3, GP4, GP5, GP6, GP7 and GP8. For reference purposes point GP8 is disposed on centerline CL. Point GP1 is disposed at a tooth root 50, 51. There are no linear segments included in the groove profile as is the case for the tooth profile in FIG. 4. Example dimensional values for the Cartesian coordinate locations for points GP1, GP2, GP3 and GP4 are included in FIGS. 5a and 5b.

An example sprocket groove is dimensioned as shown in FIG. 5A. The values in FIG. 5A and FIG. 5B are given as examples only and are not intended to limit the breadth of the invention. Reference to all dimensions is with respect to the origin at (0,0,0) in FIG. 4 and FIG. 5 respectively. The approximate position of the upper portion of the reservoir zone ζ is at a distance "x" from coordinate 0,0,0.

FIG. 6 is a side view of the engagement between the inventive belt tooth and sprocket. In this embodiment there is a reservoir ζ where the tooth engages the groove. This results in a free volume into which the tooth material may slightly expand and which may act as a reservoir for air or oil or other fluid. However, the tooth bears upon the groove at 30 and 40 since the tooth thickness at this location is 15% to 20% greater than the width of the groove, giving an interference fit at 30 and 40. The portion of the tooth tip surface at width 100 between 30 and 40 approximates a simply supported beam with a distributed load.

The width 100 may be adjusted according to the operational conditions of the system. In this embodiment the surface portion 100 is substantially flat. A belt comprising a tensile cord disposed within a belt body, at least two teeth projecting from the belt body, the belt comprising a pitch length measured between the at least two teeth on the belt, one of the at least two teeth having a tooth tip and a profile comprising a first radius and a second radius and a third radius disposed between a first linear segment and a second linear segment, the tooth having a width that is approximately 35% of a pitch length at 90% of a tooth height so as to result in an interference fit between the one of at least two teeth and groove at 90% of the tooth height.

A belt and sprocket system comprising a tensile cord disposed within a belt body, at least two teeth projecting from the belt body, the belt comprising a pitch length measured between the at least two teeth on the belt, one of the at least two teeth having a tooth tip and a profile comprising a first radius and a second radius and a third radius disposed between a first linear segment and a second linear segment, the sprocket having a groove for receiving one of the at least two teeth, the groove profile comprising a first radius and a second radius and the third radius and a fourth radius, each of which is connected in series to the others and each of which is unequal in length to the other radii, the tooth having a width that is approximately 35% of a pitch length at 90% of a tooth height so as to result in an interference fit between the one of at least two teeth and groove at 90% of the tooth height; and a volume between the tooth tip and the groove.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A belt and sprocket system comprising:
a tensile cord disposed within a belt body;
at least two teeth projecting from the belt body;
the belt comprising a pitch length measured between the at least two teeth on the belt;
one of the at least two teeth having a tooth tip and a profile comprising a first radius and a second radius and a third radius disposed between a first linear segment and a second linear segment;
the sprocket having a groove for receiving one of the at least two teeth, the groove profile comprising a first radius and a second radius and the third radius and a fourth radius, each of which is connected in series to the others and each of which is unequal in length to the other radii;
the tooth having a width that is approximately 35% of a pitch length at 90% of a tooth height so as to result in an interference fit between the one of at least two teeth and groove at 90% of the tooth height; and
a volume between the tooth tip and the groove.

2. The belt and sprocket system as in claim 1, wherein the tooth height does not exceed 40% of the pitch length.

3. The belt and sprocket system as in claim 1, wherein the one of at least two teeth comprises a tooth angle at a root of at least 11 degrees.

4. The belt and sprocket system as in claim 1, wherein the groove comprises a depth greater than a tooth height.

5. The belt and sprocket system as in claim 1, wherein the groove comprises a contact angle between 100 and 120 degrees at the tooth tip.

6. The belt and sprocket system as in claim 1, wherein the groove angle is within 2 degrees of the tooth angle at a root.

7. The belt and sprocket system as in claim 1, wherein the tooth has a width that is in the range of 15% to 20% greater than a groove width at 90% of a tooth height so as to result in an interference fit between the one of at least two teeth and groove at 90% of the tooth height.

8. A belt and sprocket system comprising:
a tensile cord disposed within a belt body;
at least two teeth projecting from the belt body;
the belt comprising a pitch length measured between the at least two teeth on the belt;
one of the at least two teeth having a tooth tip and a profile comprising a first radius and a second radius and a third radius disposed between a first linear segment and a second linear segment;
the sprocket having a groove for receiving one of the at least two teeth, the groove profile comprising a first radius and a second radius and the third radius and a fourth radius, each of which is connected in series to the others and each of which is unequal in length to the other radii;
the tooth having a width that is in the range of 15% to 20% greater than a groove width at 90% of a tooth height so as to result in an interference fit between the one of at least two teeth and groove at 90% of the tooth height; and
a reservoir between the tooth tip and the groove.

9. The belt and sprocket system as in claim 8, wherein the tooth height does not exceed 40% of the pitch length.

10. The belt and sprocket system as in claim 8, wherein the one of at least two teeth comprises a tooth angle at a root of at least 11 degrees.

11. The belt and sprocket system as in claim 8, wherein the groove comprises a depth greater than a tooth height.

12. The belt and sprocket system as in claim 8, wherein the groove comprises a groove angle between 100 and 120 degrees at the tooth tip.

13. The belt and sprocket system as in claim 8, wherein the groove angle is within 2 degrees of the tooth angle at a root.

14. A belt comprising:
a tensile cord disposed within a belt body;
at least two teeth projecting from the belt body;
the belt comprising a pitch length measured between the at least two teeth on the belt;
one of the at least two teeth having a tooth tip and a profile comprising a first radius and a second radius and a third radius disposed between a first linear segment and a second linear segment;
the tooth having a width that is approximately 35% of a pitch length at 90% of a tooth height so as to result in an interference fit between the one of at least two teeth and groove at 90% of the tooth height.

* * * * *